US006599078B1

(12) United States Patent  
Elder

(10) Patent No.: US 6,599,078 B1
(45) Date of Patent: Jul. 29, 2003

(54) ASSEMBLY FOR REMOVABLY SUPPORTING CARGO ON A VEHICLE

(76) Inventor: George Scott Elder, 5290 NW. 21 Ave. Box A-7, Fort Lauderdale, FL (US) 33309

( * ) Notice: Subject to any disclaimer, the term of this patent is extended or adjusted under 35 U.S.C. 154(b) by 0 days.

(21) Appl. No.: 09/842,498

(22) Filed: Apr. 25, 2001

(51) Int. Cl.[7] ................................................. B60P 1/43
(52) U.S. Cl. ........................ 414/542; 224/521; 212/180; 212/901; 414/462
(58) Field of Search ................................. 414/462, 542; 224/521; 212/180, 901

(56) References Cited

U.S. PATENT DOCUMENTS

| | | | |
|---|---|---|---|
| 3,917,094 A | * | 11/1975 | Magneson .................. 114/372 |
| 3,952,893 A | | 4/1976 | Kolesar |
| 4,084,736 A | * | 4/1978 | Jacobs, Jr. .................. 224/492 |
| 4,881,864 A | | 11/1989 | Amato |
| 4,971,509 A | | 11/1990 | Sechovec et al. |
| 5,018,651 A | | 5/1991 | Hull et al. |
| 5,368,209 A | | 11/1994 | Hill |
| 5,385,280 A | * | 1/1995 | Littlepage et al. .......... 224/521 |
| 5,433,356 A | * | 7/1995 | Russell ....................... 224/519 |
| 5,456,564 A | * | 10/1995 | Bianchini .................... 224/508 |
| 5,567,107 A | * | 10/1996 | Bruno et al. ................ 241/200 |
| 5,752,799 A | * | 5/1998 | Carey et al. ................ 224/403 |
| 5,791,633 A | | 8/1998 | Walker |
| 5,791,858 A | * | 8/1998 | Sasser ........................ 414/462 |
| 5,826,768 A | | 10/1998 | Gamulo |
| 6,050,548 A | | 4/2000 | Leger |
| 6,099,035 A | | 8/2000 | Garvin, III |
| 6,138,992 A | | 10/2000 | Bell |
| 6,155,623 A | * | 12/2000 | Lane .......................... 224/405 |
| 6,250,483 B1 | * | 6/2001 | Frommer .................... 212/180 |

OTHER PUBLICATIONS

Abraham, Richard J., "Ladder Transport System", Aug. 19, 2002, U.S. patent application Publication, US 2002/0117821 A1.*

* cited by examiner

*Primary Examiner*—Janice L. Krizek
*Assistant Examiner*—Michael J. Kwon
(74) *Attorney, Agent, or Firm*—Malloy & Malloy, P.A.

(57) ABSTRACT

An assembly for positioning and removably supporting cargo on the exterior of a vehicle, wherein the cargo is preferably mounted on a mobile carrier assembly such as a hand truck. A hoist assembly includes a winch and lifting cable and is concurrently supported, along with the mobile carrier, on a base which is removably secured to a hitch structure mounted on the vehicle. A support assembly is secured to the base and is structured to independently but concurrently support both the hoist assembly and the mobile carrier, with or without the cargo thereon. Upon removal of the mobile carrier from the vehicle, the cargo supported thereon can be transported over the ground or other support surface to an intended location for use without requiring repeated loading and unloading of the cargo from the mobile carrier.

21 Claims, 5 Drawing Sheets

ASSEMBLY FOR REMOVABLY SUPPORTING CARGO ON A VEHICLE

BACKGROUND OF THE INVENTION

1. Field of the Invention

This invention relates to an assembly for positioning a mobile carrier or other load in a supported position on the exterior of a vehicle and comprises a hoist assembly and a support assembly. Both the load and the hoist assembly are concurrently mounted on the vehicle, preferably by being interconnected to the vehicle's hitch structure, wherein the mobile carrier may be positioned in and removed from its supported position without the cargo being repeatedly loaded on and unloaded from the carrier.

2. Description of the Related Art

It is common practice to carry various types of loads, cargo, etc. on the interior of vehicles. Depending on the weight of the load or cargo intended to be transported, it is also known to use some type of lifting device. Typically such lifting devices are structured to lift and position the intended load into some part of the interior of the vehicle. By way of example only, pick-up trucks are specifically designed to use the truck bed as a support platform for the positioning of a variety of different loads on the truck. Also, with the increased popularity of sport utility vehicles (SUV) the interior cargo area associated with such vehicles is also, in many cases, specifically designed for the containment of a variety of different types of cargo.

In addition to the above, more conventional motor vehicles, such as passenger automobiles and the like may in some instances be adapted for the mounting and support of a variety of different loads, cargo, etc. on the exterior thereof. In such instances the use of auxiliary article carriers attached to some portion of the exterior of the vehicle has been attempted. However, the known or conventional mounting of carrier structures specifically designed to be secured to the exterior portion of a vehicle, for the transport thereof, typically requires that such article carriers be at least partially dismantled or otherwise modified in order to accomplish their secure mounting on the vehicle. The resulting problems and disadvantages associated with such known or conventional auxiliary article carriers are obvious and significant. More specifically, it is extremely inconvenient to the user of such known structures to assemble and or disassemble various portions of the auxiliary carrier when it is desired to either load or unload the carrier onto the vehicle.

In addition to the above, such carrying devices are normally not capable of having an intended load or cargo maintained thereon during the loading and unloading procedure. As a result, each time an auxiliary carrier is secured to a vehicle or removed therefrom the user must remove the intended cargo from the carrier, place it in a convenient location and then re-load the cargo once the vehicle and supported carrier reaches an intended designation. The above procedure, in addition to being extremely inconvenient, also defeats the primary purpose of using article carriers since the user must repeatedly load and unload the cargo from the carrier, as set forth above.

By way of example only, a user who enjoys the sport of fishing frequently employs the use of a mobile carrier assembly such as, but not limited to, various types of hand propelled carts or the like. These devices are used to move various equipment, devices, and supplies which may be required during a day of fishing. Such mobile carrier assemblies are commonly used in the transport of the various equipment, supplies, etc. from a vehicle to a fixed land object where, such as a pier, jetty, etc. where the fishing is to be conducted. Obviously, to assist the transport of the aforementioned equipment and supplies to and from the vehicle to the fishing site the mobile carrier assembly is extremely helpful. However, often times such carrier assemblies, as generally set forth above, are difficult to load onto and remove from the transporting vehicle. Therefore as with known or conventional auxiliary article carriers, it is not uncommon for the user to repeatedly load and unload all of the supplies during the mounting and removal of the carrier on and from the vehicle.

In addition to the time and inconvenience associated with such loading and unloading it is also well recognized that such equipment, supplies etc. involve a considerable amount of weight generally in the range of 200 pounds of more. Accordingly, it is readily apparent that the continuous and repeated handling of such equipment becomes a significant burden which seriously detracts from the intended enjoyment of fishing.

In an attempt to overcome the problems associated with the lifting, positioning and supporting of a variety of different loads, other than but including fishing supplies and equipment, the prior art has attempted to utilize a variety of lifting devices or winch assemblies. However, such known attempts typically involve situations where the winch is utilized to lift heavier than normal loads off the ground or other supporting surface and into or on an area or support platform specifically intended to store and support cargo. Therefore, known lifting devices are typically associated with pick-up trucks, vans, SUV's, etc. Such devices are not easily adaptable for use with conventional passenger cars. To the contrary, such passenger vehicles are best suited to have a mobile carrier assembly, along with the cargo associated therewith secured to an exterior portion of the vehicle. Also, known lifting devices, of the type set forth above, frequently require their disassembly, once the cargo is loaded, in order that the vehicle may travel safely between intended locations.

Therefore it is well recognized that there are long existing and significant problems relating to lifting, positioning and supporting of a variety of different cargos on a vehicle for the transport thereof between intended locations. Accordingly, a need exists for an assembly capable of facilitating the storage of a mobile carrier assembly on the exterior of virtually any type of motor vehicle in a manner which eliminates the requirement or need for removing the cargo Jet from the mobile carrier assembly during the loading and unloading procedure. In addition such an improved and preferred assembly should include the utilization of an effectively structured hoist assembly which also may be mounted to the exterior of the vehicle concurrently to the mounting and support of the aforementioned mobile carrier assembly and cargo associated therewith. Utilization of such an improved assembly, would therefore eliminate most if not all of the problems and disadvantages associated with the transporting of various supplies and equipment between locations, by means of a motor vehicle, and also eliminate the unnecessary requirement of repeated loading and unloading of mobile carrier assemblies used to transport an intended cargo to a site or location for use. Finally, such an improved assembly should be durable, safe in its construction and use and be capable of being connected to the exterior of the vehicle without requiring any unusual or significant structural modifications of the vehicle, thereby enabling the use of such an improved assembly available for a variety of different applications.

SUMMARY OF THE INVENTION

The present invention is directed to an assembly structured to position a load preferably, but not necessarily, in the form of a mobile carrier assembly such as a hand truck, in a supported position on the exterior of a vehicle. In such a supported position the load can be transported to various locations and upon arrival at an intended designation, the load can be quickly and easily removed from its supported position on the vehicle. Once so removed the mobile carrier assembly or hand truck can travel over the ground or other supporting surface so as to further transport the cargo mounted thereon to an intended site of use. The cargo remains secured to the hand truck during all phases of it being mounted on and removed from the exterior of the vehicle. The need to repeatedly load and unload the cargo from the hand truck, as is common in conventional mobile carrier assemblies, is eliminated.

As will be described in greater detail hereinafter, the versatility of the assembly of the present invention allows for the positioning a variety of different loads and associated cargos in a supported position on the vehicle. As such, the load and or cargo may weigh several hundred pounds, wherein the weight limit is determined not only by the structural features of the assembly of the present invention, but also by the load restrictions of the hitch structure secured to the vehicle.

More specifically, the assembly of the present invention comprises a base which is connected to the exterior of a motor vehicle, preferably by means of interconnecting the base to a hitch structure. Further, the base is preferably removably connected to the hitch structure of the vehicle but, due to its relatively compact structure, may be left in place even when a load is not intended to be mounted on and transported by the vehicle.

In addition, at least one preferred embodiment of the assembly of the present invention includes a hoist assembly comprising a winch and a lifting cable connected thereto. The hoist assembly further includes a stanchion and a boom connected in outwardly extending relation to the stanchion, wherein the boom defines at least a portion of the path of travel of the cable between the winch and the load, to which the cable is attached.

Another feature of the assembly of the present invention includes the provision of a support assembly connected to the base and including individual support portions for concurrently supporting the hoist assembly and the load or mobile carrier assembly on the vehicle. More specifically, the support assembly includes at least a first support portion specifically structured to removably retain a portion of the hand truck or carrier assembly in a position or orientation which does not require the removal of cargo from the hand truck. Also, the support assembly includes at least a second support portion for the independent support of the hoist assembly, and in particular the stanchion associated therewith. The second support portion is further structured to maintain the stanchion, the boom, the winch and the connecting cable all in a substantially operative position, concurrently to the support of the hand truck, on the exterior of the vehicle. The positioning of both the hoist assembly and the concurrently supported hand truck is such as to facilitate travel of the vehicle and secure attachment of the assembly on an exterior thereof in a safe manner.

Also, the versatility of the present invention is demonstrated by the ability to mount and support a variety of different loads, other than a hand truck or like mobile carrier, on the vehicle. Accordingly, the structure of the load may vary and be of different weights, sizes and configurations. However, when the load is in the form of a hand truck or like carrier, it may be mounted on and removed from the vehicle without necessitating the repetitive loading and unloading of the cargo therefrom.

Therefore, one feature of the present invention includes the structuring of the boom to have a selectively variable length, so as to extend outwardly from the stanchion into different positions. The boom, as set forth above, defines at least a portion of the path of travel of the connecting cable and as such serves to position the connecting cable relative to the load. More specifically, the point of attachment of the connecting cable to the load may be varied dependent, at least in part, on the location of the center of gravity of the hand truck and or cargo. Proper alignment of the cable and the center of gravity is important in maintaining a proper orientation of the hand truck and the cargo, so as to facilitate its positioning into and out of a preferred supported position on the vehicle by virtue of an interconnection of the base to the hitch structure associated with the vehicle.

In addition, the length of the boom may be selectively varied into different preferred positions depending on whether the hand truck and cargo are being mounted on or removed from the support assembly. Also, further adjustment of the boom, resulting in selective positioning of the connecting cable relative to the load, can be easily accomplished to accommodate a variety of different cargos mounted on the hand truck. Therefore, proper orientation of the load and cargo can be easily accomplished when the center of gravity of a particular cargo significantly differs from the last cargo mounted on and transported by the hand truck or like mobile carrier assembly.

It is emphasized that the structural components of the assembly of the present invention are such that a variety of different load/cargo combinations may be positioned, mounted and supported on the base of the assembly, other than a hand truck or like mobile carrier assembly as is continuously referred to in the description of the most preferred embodiment provided hereinafter.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
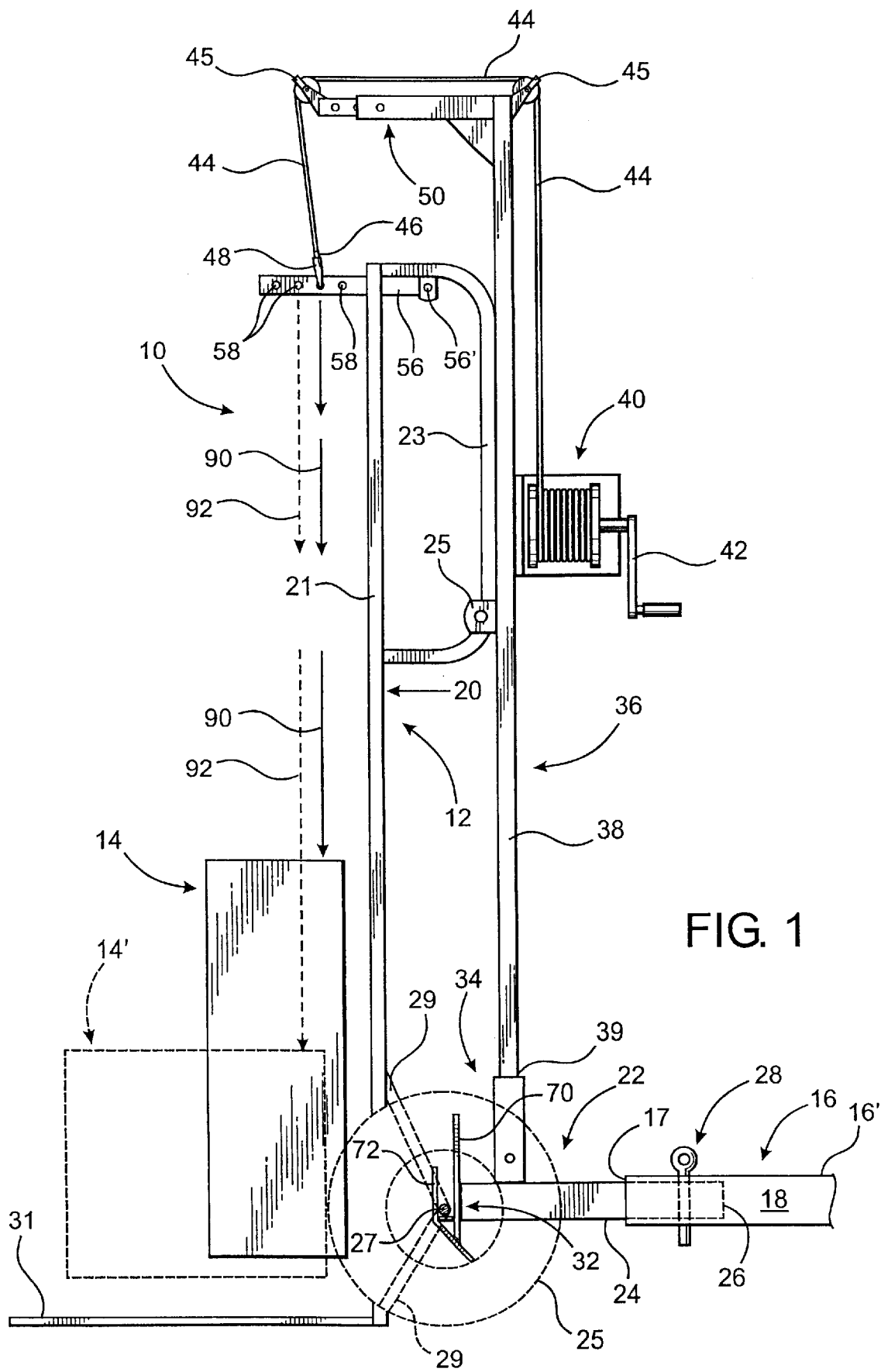
FIG. 1 is a side view in partial phantom of a preferred embodiment of the positioning and mounting assembly of the present invention connected to a hitch structure associated with a motor vehicle.

As shown in the accompanying drawings, the present invention is directed to an assembly generally indicated as 10, structured to position, mount and support a load, generally indicated as 12, with or without a plurality of different cargos generally indicated as 14 and or 14', mounted on the exterior of a vehicle. The assembly 10, is preferably secured to the vehicle by means of a hitch structure generally indicated as 16, which may be of conventional design. The hitch structure 16 is secured to the frame or undercarriage portion of the vehicle (not shown for purposes of clarity) and extends outwardly, preferably from the rear end thereof, into an accessible location, as shown in FIG. 1. The hitch structure 16 may be in the form of a "box-type" hitch having an elongated draw bar 16' which includes a square or rectangular opening 17 communicating with a hollow interior 18 of similar configuration.

The most preferred embodiment of the assembly 10 will be described in detail hereinafter with specific reference to the load 12 being in the form of a hand truck or like mobile carrier assembly, generally indicated as 20. However, it is emphasized that the load 12 may be defined by a variety of structures, other than the hand truck or mobile carrier assembly 20. In addition the hand truck 20, or other structure defining the load 12, may be capable of removably supporting a variety of different equipment, supplies, objects, devices, appliances, etc. For purposes of clarity all of the aforementioned items are generically categorized and referred to herein as "cargo" when describing the one or more preferred embodiments of the present invention.

With reference to FIGS. 1 through 4, the preferred embodiment of the assembly 10 comprises a base generally indicated as 22 and including an elongated tongue 24. The tongue 24 is dimensioned and configured to be telescopically attached to the hitch structure 16, such as by having an outer end 26 thereof pass through the open end 17 and into the interior 18 of the draw bar 16'. In such a position, a locking device, such as a locking pin or other structure, generally indicated as 28, passes through aligned apertures cooperatively formed in both the draw bar 16' and in the tongue 24.

Figure 2:
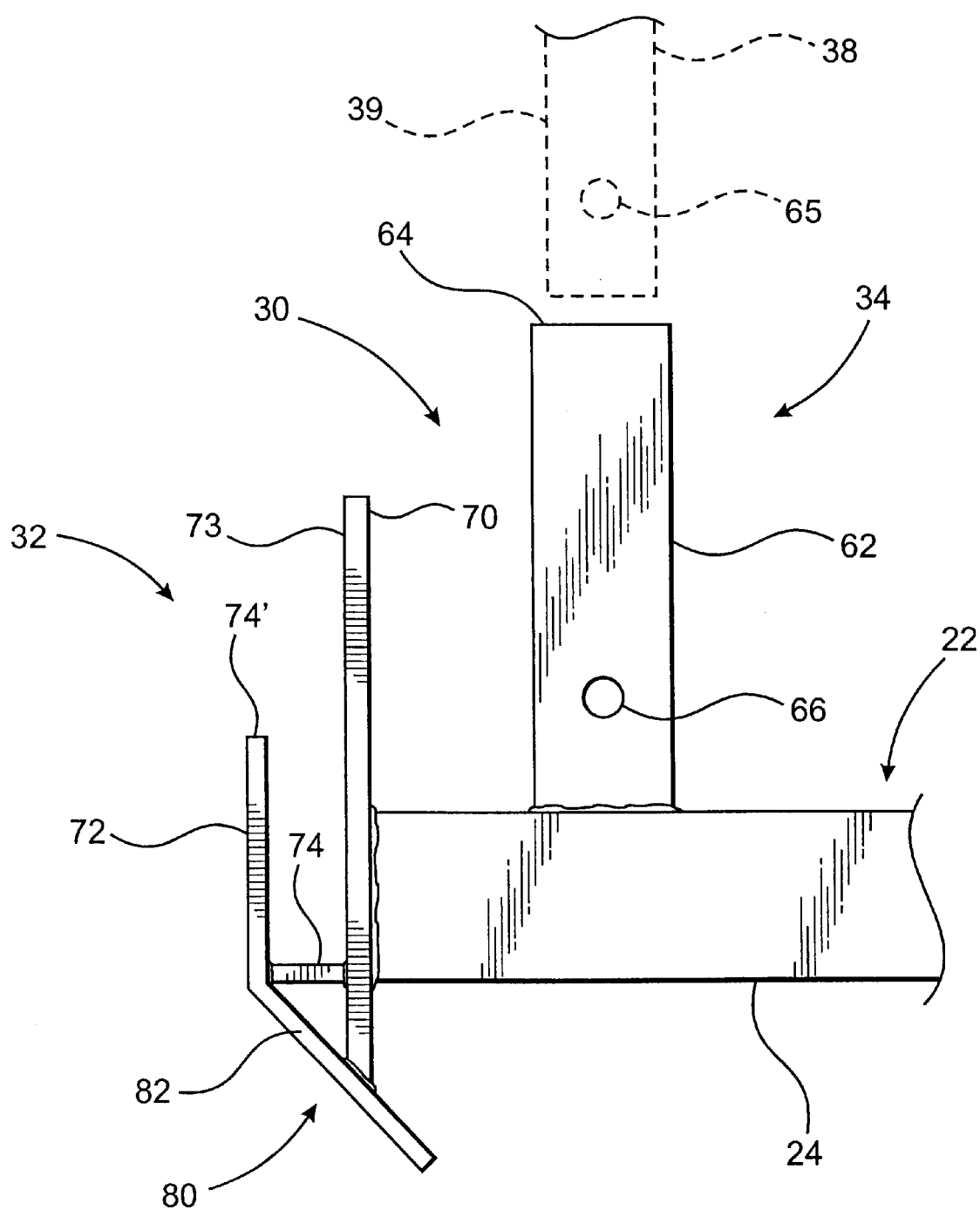
FIG. 2 is a side view in partial phantom of a base and support assembly associated with the preferred embodiment of FIG. 1.
Figure 3:
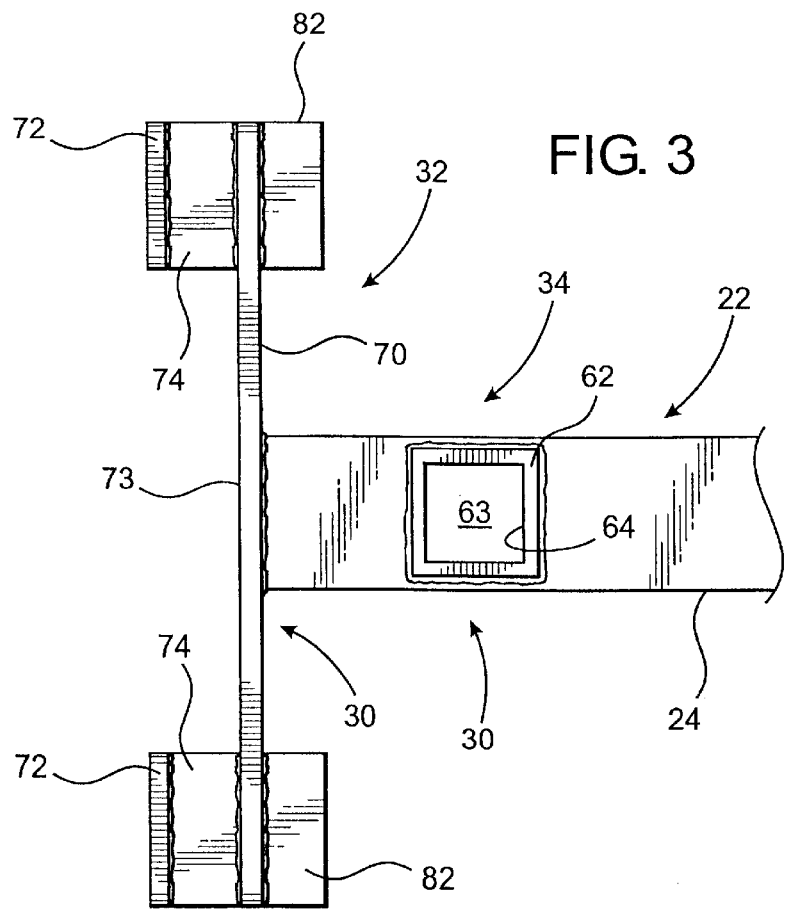
FIG. 3 is a front view of the embodiment of FIG. 2.
Figure 4:
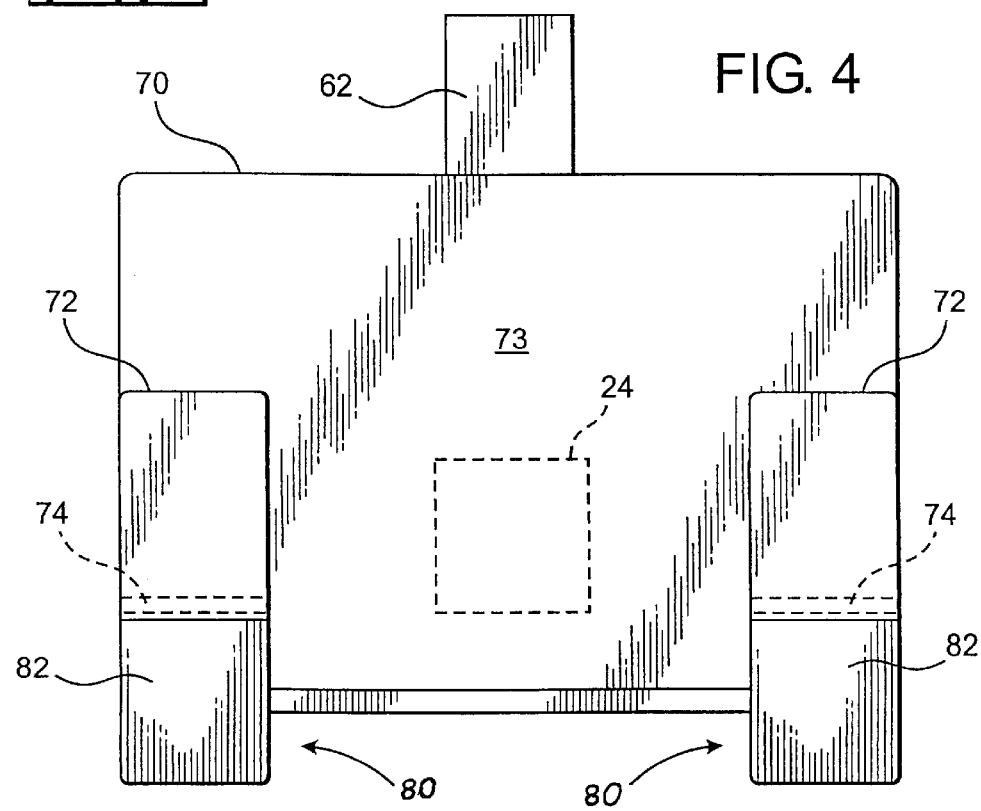
FIG. 4 is a top view of the embodiment of FIGS. 2 and 3.

As best shown in FIGS. 2 through 4, the base 22 also includes a support assembly generally indicated as 30 being connected thereto. The support assembly 30 includes at least a first support portion generally indicated as 32 and a second support portion generally indicated as 34. The first and second support portions 32 and 34 respectively, are disposed, dimensioned and configured to concurrently support both the load 12 and a hoist assembly, generally indicated as 36, on the exterior of the vehicle by virtue of the secured but removable attachment of the base 22 to the hitch structure 16.

In a most preferred embodiment of the assembly 10, the hoist assembly 36 includes an elongated stanchion 38 having a lower end 39 secured to the second or stanchion support portion 34. The stanchion 38 is thereby maintained in an operative position, being vertically oriented so as to extend upwardly and outwardly from the base 22. The hoist assembly 36 also includes a winch generally indicated as 40 which may be manually or otherwise powered by virtue of a crank arm and handle 42. An elongated connecting cable 44 is wound about and thereby connected in driven relation to the winch 40. The cable 44 may be movably connected to travel along at least a portion of the stanchion 38 by virtue of a plurality of pulleys 45. The free end 46 of the cable 44 includes an appropriate connector or hook 48 to facilitate attachment directly to the load 12 preferably defined by the hand truck or like mobile carrier assembly 20.

Figure 5:
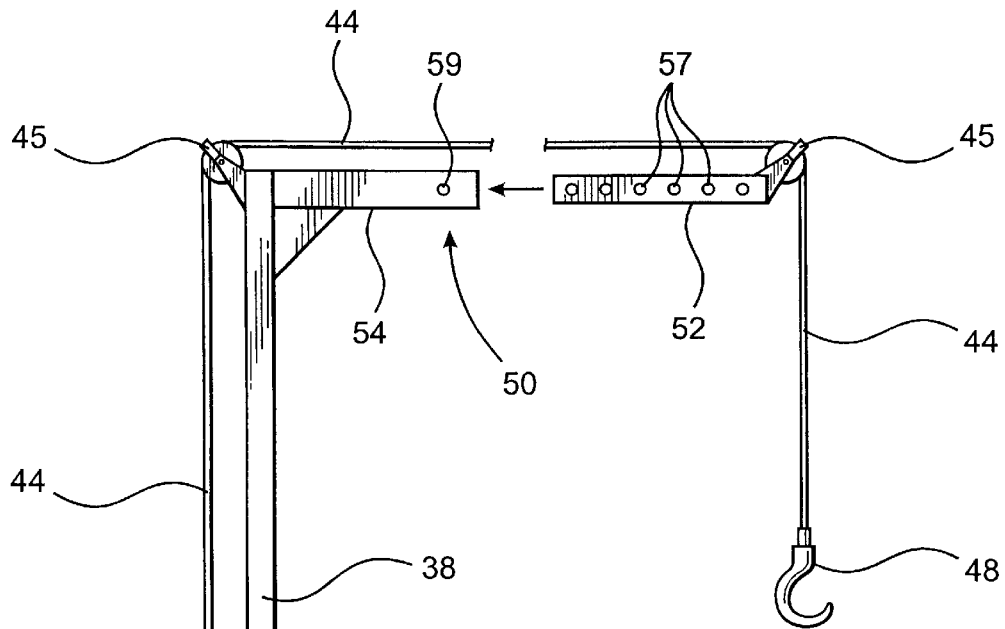
FIG. 5 is a detailed view in partially exploded form and cutaway of a portion of a hoist assembly associated with the embodiment of FIG. 1.
Figure 6:
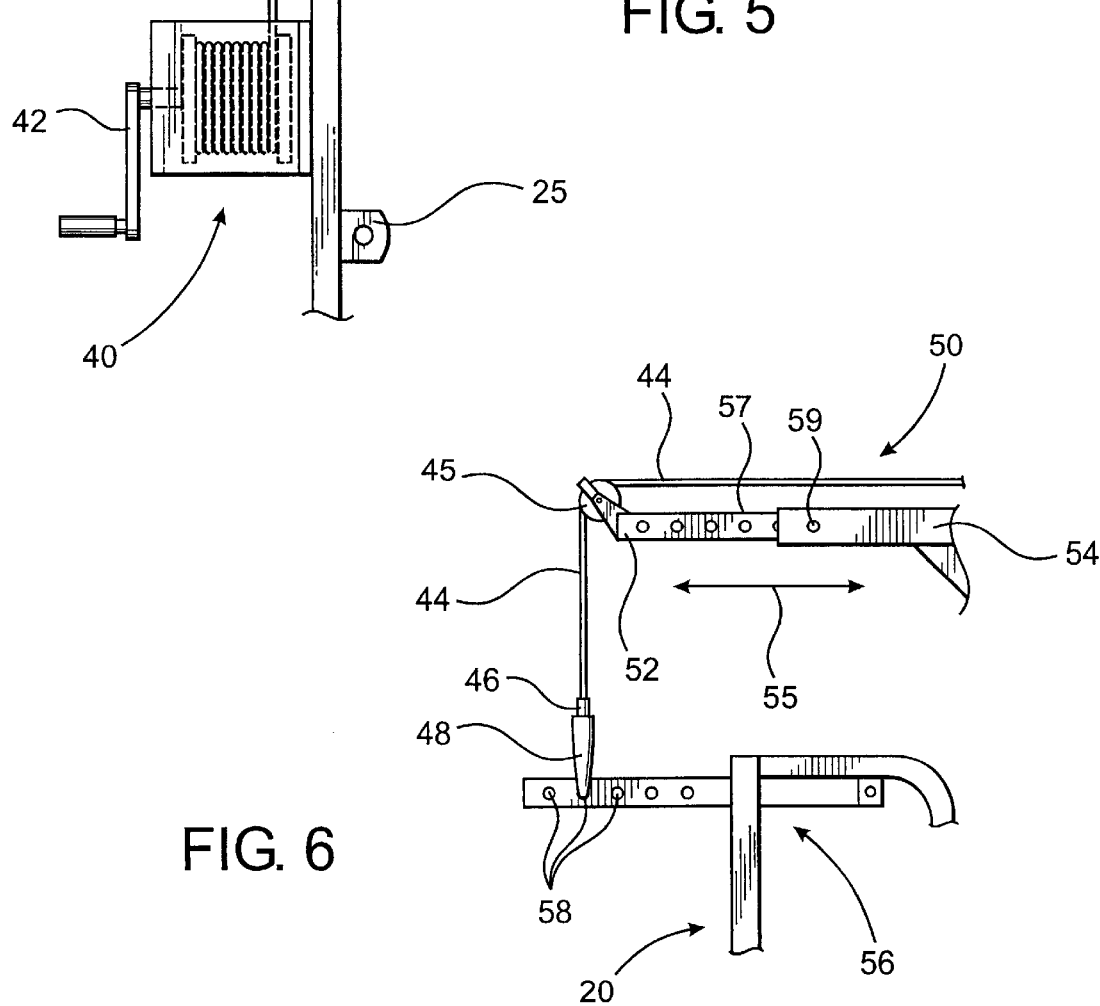
FIG. 6 is a detailed view in partial cutaway showing interaction between a load and a portion of the hoist assembly of the embodiments of FIGS. 1 and 5.

Another feature of the assembly 10 is the provision of a boom generally indicated as 50 connected to and extending laterally outward from the stanchion 38. As shown in FIGS. 5 and 6 the boom 50 includes at least one arm segment 52 slidingly attached, such as by a telescoping interconnection, to a sleeve-like mounting arm 54. The telescoping interconnection between the segment arm 52 and the sleeve arm 54 defines the boom 50 as having a variable length which may be selectively adjustable so as to properly orient or position the connecting cable 44 relative to the hand truck 20 or other load 12. Moreover, the segment arm 52 may be selectively positioned into and out of the sleeve arm 54, as indicated by directional arrow 55, thereby facilitating the establishment of the preferred length of the boom 50. As such, the segment arm 52, may be removably locked or fixed into any of a variety of different longitudinal positions relative to the sleeve arm 54 by virtue of a plurality of locking apertures 57. The locking aperture 57 are formed in the segment arm 52 and disposed in aligned relation with the opening or aperture 59 formed in the sleeve arm 54. A locking pin or other device may be used to accomplish the removable fixed or locked positioning of these two components.

In order to further facilitate the proper positioning of the cable 44 and the connector 48 relative to the hand truck or like mobile carrier 20, a mounting arm 56 is secured to the hand truck 20 by a hinge-type connection 56'. The mounting arm 56 includes a plurality of connecting apertures 58 to which the free end connector 48 of the connecting cable 44 may be attached. As will be explained hereinafter with specific reference to FIGS. 7 through 10, the proper positioning of the connecting cable 44 and the location of connection of the free end connector 48 to the hand truck 20 greatly facilitates both the mounting and removal of the hand truck 20 relative to the support assembly 22. Such proper positioning is at least partially dependent on the location of the center of gravity of the combined cargo 14, 14' and the hand truck 20 and the alignment of the cable 44 with the combined center of gravity.

Again with primary reference to FIGS. 1 through 4, the support assembly 22, as set forth above, includes a second support portion 34 which may be more specifically described as a stanchion support portion. The stanchion support portion 34 includes an elongated sleeve 62 having a hollow interior 63 and an open end 64 through which the lower most end 39 of the stanchion 38 passes. The transverse dimension of the stanchion 38 and the hollow interior 63 of the sleeve or arm 62 is such as to provide telescopic, sliding engagement of the end 39 into and along the length of the interior 63. In addition, locking apertures 65 and 66 respectively formed in the stanchion 38 and the supporting sleeve 62 are relatively disposed so as to be aligned and allow the passage there through of a locking pin or other structure which serves to secure the stanchion 38 to the support sleeve 62. Also, as shown in FIG. 4, the support sleeve 62 and hollow interior 63 may have a multi-sided configuration which substantially corresponds to a similar, multi-sided configuration of the exterior surface of the stanchion 38 so as to prevent relative rotation there between when the end 39 of the stanchion 38 is disposed within the hollow interior 63, as described above.

The support assembly 22 also comprises the first support portion 32 which may be more specifically described as the load support portion. As such, the load support portion 32 includes a mounting plate 70 and at least one but preferably a plurality of retaining members 72 or tangs. The retaining members 72 are secured to an outer or exposed face 73 of the mounting plate and are disposed in outwardly spaced relation thereto. A seat member 74 is disposed in interconnecting relation at a lower end of the space between the retaining members 72 and the plate 70. In addition, when at least two of the retaining members 72 are utilized, they are spaced a sufficient distance from one another, preferably at the opposite ends of the plate 70, to restrict lateral movement of the hand truck when it is mounted on the load support portion 34.

The mounting arm 56 is pivotally or otherwise movably connected as at 56' to an upper portion of the hand truck 20, as shown in FIGS. 1 and 6. In addition, the hand truck 20 includes a pair of supporting wheels 25 interconnected by an axle 27. The axle 27 serves to rotatably mount the support wheels 25 on the lower end of the frame 21 so as to facilitate travel of the hand truck 20, by manual propulsion, over the ground or other supporting surface. The axle is connected by a plurality of brace members 29 structured to further support the frame 21 as well as any cargo 14, 14' mounted on the hand truck 20 over the ground or supporting surface. Various types of cargo, 14 or 14' may be positioned, at least in part, on a platform 31 which may vary in size so as to accommodate cargo components 14 and 14' of various sizes, weights and configurations.

By virtue of the preferred embodiment of the load 12 being in the form of a hand truck 20 or like mobile carrier assembly, the load support portion 32 is structured in the manner described in order to best facilitate the mounting, positioning and support of the hand truck 20 on the base 22 and interconnected to the hitch structure 16 as shown in FIG. 1. Accordingly, the axle 27 is positionable within the space existing between the one or more retaining members 72 and the outer or exposed surface 73 of the plate 70 by its passage through the open upper end 74' of this space. When so positioned the axle 27 is supported on the seat 74 located between the one or more retaining members 72 and the plate 70, as set forth above.

As set forth above the selective positioning of the boom 50 outwardly from the stanchion 38 into a variety of different longitudinal positions allows for the preferred positioning of the cable 44 and more specifically the end connector 48. The cable 44 is thereby connected to the hand truck 20, or other load 12, at a location which facilitates its mounting on the support assembly 30 or its removal therefrom, as will be explained in greater detail with reference to FIGS. 1 and 7 through 10. More specifically, the location of the connection between the end connector 48 and the hand truck 20 should be such as to substantially align the cable with the combined center of gravity of the hand truck 20 and the cargo 14 or 14'.

In order to further provide for the effective mounting of the hand truck 20 on the load support portion 34, at least one preferred embodiment of the assembly 10 also includes a guide assembly 80. The guide assembly 80 comprises a guide structure 82 preferably having a slanted orientation as disclosed in FIG. 2. Proper alignment of the cable 44 with the center of gravity, as set forth above will facilitate interruptive engagement of the guide structure 82 with the axle 27 during the lifting of the hand truck 20 from the ground or other support surface onto the load supporting portion 32.

Figure 7:
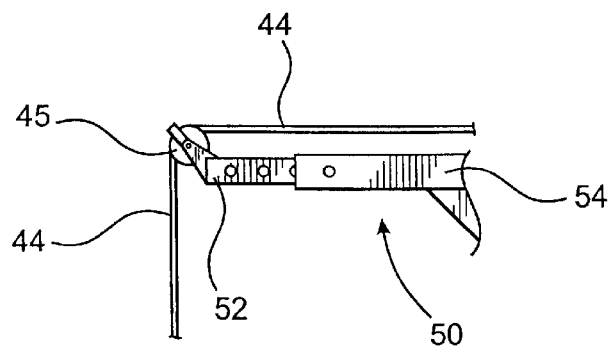
FIG. 7 is a side view in partial cutaway of a preferred embodiment of a boom structure associated with the hoist assembly of the present invention.
Figures 8, 10:
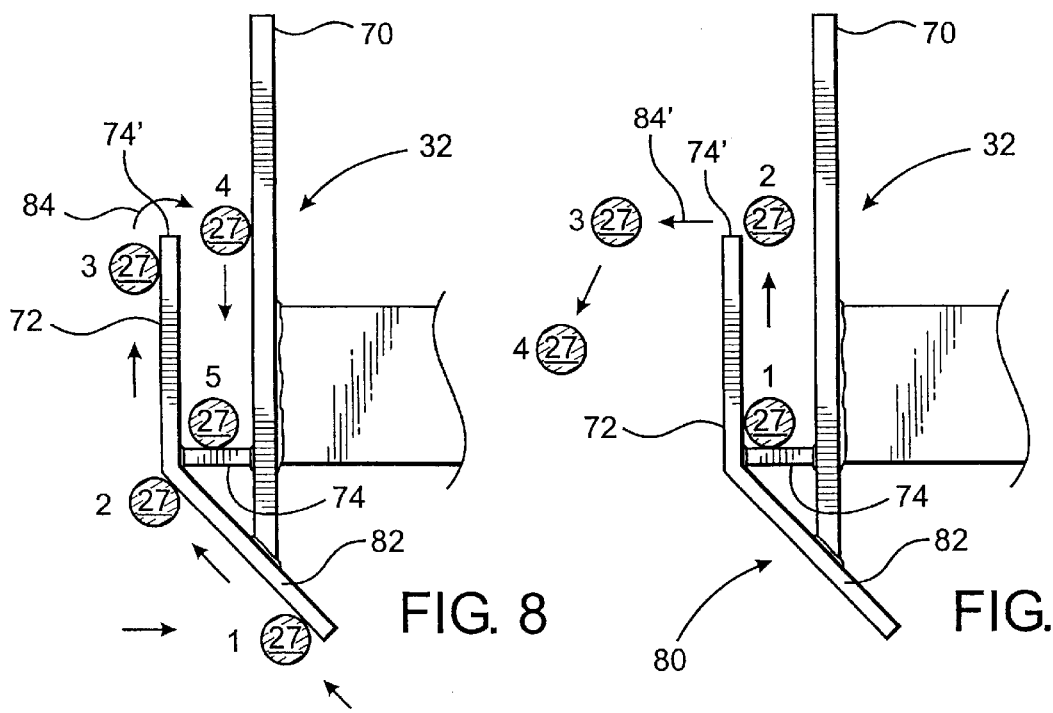
FIG. 8 is a schematic representation of the sequential positioning of a portion of the load, during a mounting procedure, relative to the support assembly in accordance with the position of the boom as shown in FIG. 7.
FIG. 10 is a schematic representation showing the sequential positions of a portion of the load as it is being removed from the support assembly associated with the preferred embodiment of the present invention.

With reference to FIGS. 7 and 8 as the connecting cable 44 is wound onto the winch 40 the hand truck 20, with the cargo 14, 14' mounted thereon, is lifted from the ground or other supporting surface. During such mounting procedure, when the cable 44 is located in the preferred position relative to the hand truck 20, the hand truck 20 will remain in a substantially vertical orientation. As the hand truck is being lifted, the guide structure 82 will interruptively engage axle 27 as it assumes the position "1" indicated in FIG. 8. Position "2" of the axle 27 indicates sliding engagement or travel of the axle 27 along the outer surface of the inclined or slanted guide member 82. Position "3" of axle 27 indicates its continued sliding engagement along the outer surface of the retainer members 72 until it passes over the open ends 74' and above the space between the retaining members 72 and the mounting plate 70. Once in position "4", the axle 27 will then be lowered by manipulation of the winch 40 until it engages and is supported on the seat 74 as shown in the final position "5" of FIG. 8.

In order to accomplish the intended movement of the axle 27 in the manner described with reference to FIG. 8, the boom 50 may be selectively positioned to have a shortened length as represented in FIG. 7. This will provide proper alignment of the cable 44 and the combined center of gravity of the hand truck 20 and cargo 14, 14', as set forth above, and facilitate the axle 27 passing into the aforementioned interruptive engagement with the guide structure 82. Inward movement of the axle 27 as indicated by directional arrow 84 will also be accomplished due to the relative orientation of the cable 44 and the center of gravity of the combined hand truck 20 and cargo 14, 14', so as dispose the axle 27 immediately above open end 74'.

To the contrary when it is desired to remove the hand truck 20 from its supported position on the load support portion 32, the boom 50 may be selectively extended outwardly to increase its overall length. This will have a tendency to force or bias the axle 27 somewhat outwardly away from the mounting plate 70 and retaining member 72. Accordingly as the cable 44 lifts the axle 27 from it supported position on the load support portion 32, as shown in FIG. 10, it passes outwardly through the open end 74' and away from the load support portion 32 as indicated by directional arrow 84'. The schematically represented sequential positions 1 through 4 of the axle 27, as also demonstrated in FIG. 10, indicates the movement of the axle when the cable and aforementioned center of gravity are properly aligned during the unloading procedure.

Figure 9:
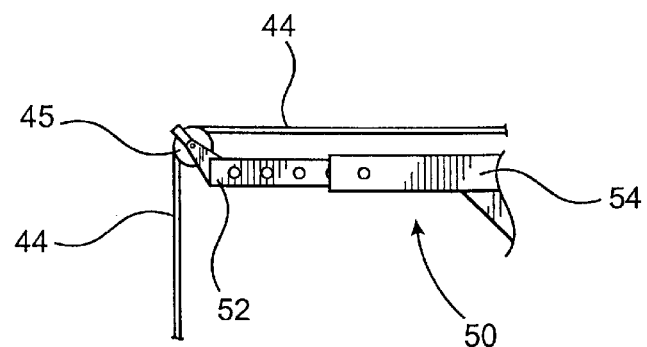
FIG. 9 is a side view in partial cutaway of the embodiment of the boom of FIG. 7 in a different orientation.

Therefore, the preferred or proper placement of the cable 44 and in particular the location of attachment of the connector 48 to the load 12 is important in order to accomplish the tendency of the axle 27 to move or travel inwardly towards the various components of the load support portion 32 schematically demonstrated by the sequential positions 1 through 4 of FIG. 8 when being located as described above. To the contrary, the cable 44 has its position changed relative to the hand truck 20 by virtue of extending the length of the boom 50 as represented in FIG. 9. This outward extension of the boom 50 and the outward positioning of the cable 44 relative to the load 12 will cause the tendency of the axle 27 to move outwardly or away from the load support portion 32, as indicated by directional arrow 84' and demonstrated in FIG. 10 when the hand truck 20 and cargo 14, 14' are removed from the support portion 32.

As emphasized above the location of the combined center of gravity of the load 12, or more specifically the hand truck 20 and the cargo 14 or 14' mounted thereon is important to maintain the hand truck in a substantially vertical orientation during the loading and unloading thereof. Therefore and by way of example only, when the cargo 14 assumes a first orientation indicated the solid lines in FIG. 1, the center of gravity will shift inwardly in accordance with the reference arrow 90. This will require the boom 50 to assume a shortened length in order to establish a location of connection between the connector 48 and the mounting arm 56 in order to align the cable 44 with the center of gravity as indicated by the reference arrows 90.

To the contrary, when the cargo as at 14' assumes a different position or in fact is a different cargo, the center of gravity will shift as indicated by phantom reference line 92. This causes a selective adjustment or positioning of the boom 50 to assume a somewhat greater length in order that the cable 44 is positioned in substantial alignment in accordance with the directional arrow 92.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for removably supporting cargo on the exterior of the vehicle, said assembly comprising:
    a) a base connected to a hitch structure on the vehicle and including a support assembly secured to said base,
    b) a hoist assembly including a winch and a cable connected in driven relation to said winch, said hoist assembly connected to said support assembly,
    c) a load comprising a hand truck assembly structured to support the cargo thereon and including a mounting structure connected to said hand truck assembly,
    d) said hoist assembly further including a stanchion and a boom connected to said stanchion,
    e) said boom and said stanchion collectively and at least partially defining a path of travel of said cable between said winch and said load,
    f) said support assembly structured to selectively support said hand truck assembly in interconnected relation to the hitch structure, and
    g) said cable connected to said mounting structure at one of a plurality of locations thereon which facilitates orientation of said cable in substantially aligned relation to a center of gravity of said load, at least when said hand truck assembly is not supported on said support assembly.

2. An assembly as recited in claim 1 wherein said boom is adjustably positionable relative to said stanchion.

3. An assembly as recited in claim 2 wherein said boom is adjustably positionable relative to said support assembly.

4. An assembly as recited in claim 1 wherein said boom is adjustably positionable relative to said support assembly.

5. An assembly as recited in claim 1 wherein said boom comprises an arm segment movably connected to a remainder of said boom and longitudinally positionable relative thereto so as to selectively vary the length of said boom and the position of said cable and said load relative to said support assembly when said load is not supported on said support assembly.

6. An assembly as recited in claim 1 wherein said mounting structure is movably connected to said hand truck assembly.

7. An assembly as recited in claim 1 wherein said support assembly comprises a load support portion and a stanchion support portion both secured to said base in interconnected relation to the hitch structure on the vehicle.

8. An assembly as recited in claim 7 wherein said load support portion and said stanchion support portion are fixedly secured to said base and removable with said base from the hitch structure.

9. An assembly as recited in claim 7 wherein said hand truck assembly comprises a pair of support wheels and an axle disposed in interconnecting relation to said support wheels.

10. An assembly as recited in claim 9 wherein said load support portion comprises a mounting plate and at least one retaining member secured in outwardly spaced relation to said mounting plate, said mounting plate and said retaining member cooperatively disposed and structured to removably retain said axle of said hand truck assembly therebetween.

11. An assembly as recited in claim 7 further comprising a guide assembly including a guide structure connected to said base.

12. An assembly as recited in claim 11 wherein said guide structure is connected to said load support portion and disposed in interruptive, engagable relation to the axle of the hand truck assembly as the load is lifted from a supporting surface into retaining engagement with said load support portion.

13. An assembly for removably supporting cargo on the exterior of a vehicle, said assembly comprising:
    a) a base connected to a hitch structure on the vehicle and including a support assembly secured to said base,
    b) a hoist assembly including a winch and a cable connected in driven relation to said winch,
    c) a load comprising a mobile carrier structured to support the cargo thereon and a mounting structure connected to said mobile carrier,
    d) said hoist assembly further including a stanchion and a boom connected to said stanchion, said stanchion connected to said support assembly,
    e) said support assembly structured to selectively support at the mobile carrier in interconnected relation to the hitch structure, and
    f) said cable connected-to said mounting structure at one of a plurality of locations thereon sufficient to maintain said mobile carrier in a substantially vertically upright orientation at least when said mobile carrier is not supported on said support assembly.

14. An assembly as recited in claim 13 wherein said mounting structure comprises an elongated configuration, said cable connected to one of said plurality of locations along the length of said mounting structure sufficient to orient said cable in substantially aligned relation with a center of gravity of said load, at least when said load is not supported on said support assembly.

15. An assembly as recited in claim 13 wherein said support assembly comprises a load support portion and a stanchion support portion both secured to said base, said load support portion and said stanchion support portion cooperatively disposed and structured to concurrently support said mobile carrier and said stanchion on the exterior of the vehicle in interconnected relation to the hitch structure.

16. An assembly as recited in claim 15 wherein said load support portion and said stanchion support portion are fixedly secured to said base and concurrently removable with said base from the hitch structure.

17. An assembly as recited in claim 13 wherein said support assembly comprises a load support portion secured to said base and structured to support said load on the vehicle.

18. An assembly as recited in claim 17 further comprising a guide assembly connected to said support assembly and disposed and structured to facilitate positioning of said mobile carrier into supported engagement with said load support portion.

19. An assembly as recited in claim 18 wherein said boom is selectively positionable relative to said support assembly so as to facilitate interruptive engageable relation of said guide assembly with said mobile carrier as the load is lifted from a supporting surface into retaining engagement with said load support portion by said cable.

20. An assembly as recited in claim 19 wherein said load support portion comprises a mounting plate and at least one retaining member secured to said mounting plate and disposed in outwardly spaced relation thereto, said mounting plate and said retaining member cooperatively structured and disposed to removably retain said mobile carrier.

21. An assembly as recited in claim 20 wherein said mobile carrier comprises a pair of support wheels interconnected by an axle, said guide structure disposed and configured to facilitate positioning of said axle in removable, supported relation between said mounting plate and said retaining member.

* * * * *